United States Patent [19]
Taggart et al.

[11] 3,863,464
[45] Feb. 4, 1975

[54] MINIATURE FLEXIBLE ROTATABLE SHAFT COUPLER

[75] Inventors: Robert B. Taggart, Mountain View; Richard H. Barth, San Jose, both of Calif.

[73] Assignee: Hewlett-Packard Company, Palo Alto, Calif.

[22] Filed: Nov. 15, 1973

[21] Appl. No.: 416,127

[52] U.S. Cl. .................. 64/11 R, 64/6, 64/27 NM
[51] Int. Cl. ............................................. F16d 3/17
[58] Field of Search ....... 64/11 R, 11 F, 27 NM, 14, 64/17 SP, 6, 13, 27 R

[56]  References Cited
UNITED STATES PATENTS

| | | | |
|---|---|---|---|
| 2,132,765 | 10/1938 | Stoekle | 64/11 R |
| 3,537,275 | 11/1970 | Smith | 64/11 R |
| 3,704,602 | 12/1972 | Einhorn | 64/27 NM |

*Primary Examiner*—Samuel Scott
*Assistant Examiner*—Randall Heald
*Attorney, Agent, or Firm*—F. David LaRiviere

[57] ABSTRACT

A simple, flexible, miniature rotatable shaft coupler is described herein. The gripping torque of the coupler is the resultant of friction forces produced between the outside diameter of the shafts and the inside diameter of the coupler. The coupler does not require set screws and produces substantially vibration-free interconnection of shafts at high rpm.

6 Claims, 3 Drawing Figures

MINIATURE FLEXIBLE ROTATABLE SHAFT COUPLER

BACKGROUND OF THE INVENTION

This invention relates generally to rotatable shaft couplers, and more particularly to microminiature rotatable shaft couplers for transmitting the torque produced at the shaft of an electric motor to a worm gear used in the magnetic card reader subsystem of a hand-held programmable calculator.

Traditional methods of end-to-end shaft coupling include the use of threaded set screws which couple one solid shaft to another by the force developed when the screws, which are threaded orthogonally to the longitudinal axis through the hollowed end of one of the shafts, are tightened against the second solid shaft inserted therein. Another common configuration uses a third hollow rod with similarly situated threaded set screws at each end which tighten against shafts inserted therein. Frequently the male shaft(s) is (are) formed with flats which receive the force of the set screws and prevent slipping of a driver shaft relative to the shaft coupled thereto. In all designs which utilize set screws the hollowed shafts must be of sufficient diameter to house a threaded screw. Another prior art coupler, referred to as a universal-joint (U-joint) coupler, permits some misalignment of the shaft without excessive load being applied to motor bearings or seals, but require sufficient space to allow room for connecting bolts, bearings, bellows or other parts comprising the coupler. Furthermore, the couplers described above often create intolerable vibration at high speeds. Such vibration may be caused or motor shaft "whip" resulting from misalignment of the shaft relative to the axis of the motor armature, or simply by the response of the coupler to the shaft misalignment as in the case of the U-joint coupler.

SUMMARY OF THE INVENTION

The preferred embodiment of the present invention provides a coupler for use in applications where small size shafts or space limitations do not permit the use of set screws or U-joint couplers but where the advantages of each are desired or required. The new coupler comprises a tubular shaped section of polyurethane or any similar rubber-like material formed to accommodate two different size shafts inserted into each end thereof. The inside diameters of the coupler are less than the diameters of the respective shafts inserted therein to provide a frictional gripping force between the inside diameter (ID) of the coupler and the outside diameter (OD) of each shaft. This gripping force is enhanced by the use of a metal sleeve fitted over the outside of the coupler to limit the amount of coupler deformation when the shafts are inserted. No set screws or connecting bolts are required in this low-cost miniature coupler which provides nearly vibration-free coupling to misaligned shafts of very small diameter used in applications with restricted space limitations.

The principal object of the present invention is to provide a low-cost, miniature rotatable shaft coupler which eliminates the use of set screws or other coupling bolts.

Another object of the present invention is to provide a coupler which allows for misalignment of the shafts without applying excessive load to bearings and seals which support the shafts.

A further object of the present invention is to provide rotatable shaft coupling which is substantially free of vibration at high speeds of rotation.

A still further object of the present invention is to provide a low cost, miniature coupler which maintains low concentricity tolerance between the shafts it couples.

DESCRIPTION OF THE PREFERRED EMBODIMENT

Figure 1:
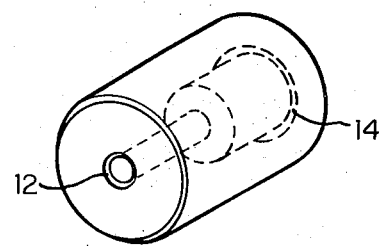
FIG. 1 is a perspective view of a coupler constructed according to the preferred embodiment of the present invention.

FIG. 1 shows a coupler 10 constructed according to the preferred embodiment of the present invention. The coupler will accommodate a motor shaft at end 12 and a worm gear shaft of larger diameter at end 14 when used in conjunction with the sleeve illustrated in FIG. 2. The coupler 10 is made of polyurethane, however any material exhibiting physical characteristics similar to rubber, including flexibility and coefficient of friction, may be used. Sleeve 20 is constructed of aluminum tubing material; however, other inflexible materials such as brass or plexiglass may be used.

Figure 2:
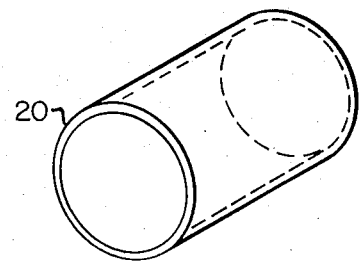
FIG. 2 is a perspective view of the coupler sleeve used in conjunction with the coupler of FIG. 1.
Figure 3:
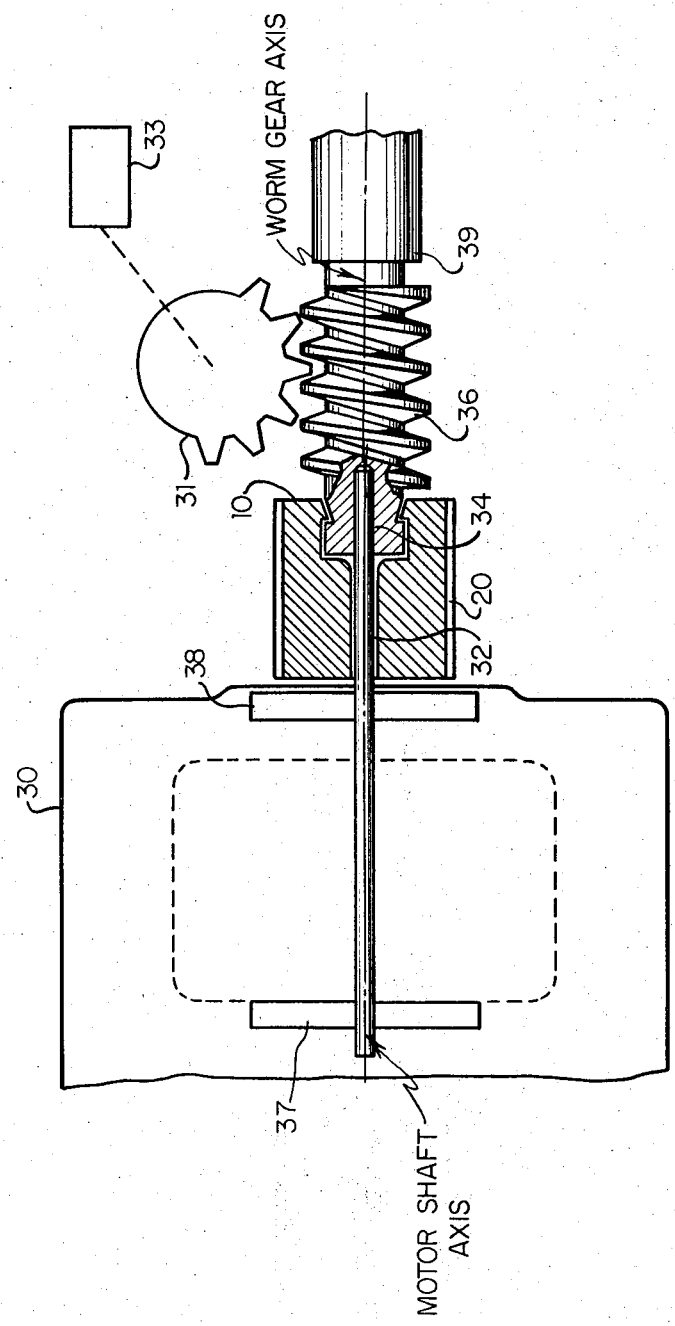
FIG. 3 is a cross-sectional view of the coupler of FIG. 1 used with the sleeve of FIG. 2 to connect an electric motor shaft to a worm gear.

Referring to FIG. 3, the coupler 10 of FIG. 1 with sleeve 20 of FIG. 2 is shown coupling shaft 32 of motor 30 to hollowed end 34 of worm gear 36. Shaft 32 is a smooth cylindrical rod without flats or other surface irregularities. The coupling end of worm gear 36 is hollowed to an ID sufficient to accept shaft 32 of motor 30, yet maintain a low concentricity tolerance between them. The inside diameters of coupler 10 are considerably less than the outside diameters of the shafts it is designed to accept. As the shafts are inserted, the OD of the coupler elastically expands to accommodate the larger diameter of the shafts. While coupling is achieved at this stage of assembly, such elastic expansion, if unchecked, reduces the effectiveness of the coupler. The gripping force produced by the coupler is the resultant of the frictional forces developed between the inside surface of the coupler and the outside surface of the shafts contained within the coupler. Addition of sleeve 20 enhances the effectiveness of the coupler by limiting the elastic diametrical expansion as the shafts are inserted, but also prevents further expansion and deterioration of the coupler material over long periods of time. The gripping torque produced by the preferred embodiment of this invention is equal to at least three times the torque that the motor develops while driving the worm gear. The coupler assembly may be designed to produce greater or lesser gripping torque depending on the anticipated load to the motor.

Coupler 10 is slightly cone-shaped; that is, the OD at end 12 is larger than at end 14. The tapered OD dimension is scaled to obtain a uniform expansion of the coupler OD along its full length when the large worm gear shaft is inserted at end 14 and when the small motor shaft is inserted at end 12. With uniform OD expansion along the full length of coupler 10, sleeve 20, which is formed with uniform ID over its entire length, produces substantially uniform frictional force on both the worm gear shaft and the motor shaft. Conversely, sleeve 20 need be designed to resist only substantially equal radial force along its length owing to coupler expansion.

As shown in FIG. 3 worm gear 36 is slip fitted on motor shaft 32. In this preferred embodiment, the clearance or concentricity tolerance between the OD of shaft 32 and the ID of the hollowed end 34 of gear 36 is typically 0.0002 inches. Such clearance taken with the amount of extension of the motor shaft into the worm gear permits some misalignment of the longitudinal axes of the motor shaft and the worm gear. If misalignment occurs, the nature of material selected for coupler 10, when assembled with sleeve 20, provides the flexible coupling necessary without adding undesirable mechanical load to either motor bearings 37 and 38, or to worm gear support bearing 39, and without degrading the concentricity of worm gear 36 on motor shaft 32 beyond tolerable limits.

In the preferred embodiment of this invention, electric motor 30 operates at approximately 10,000 revolutions per minute (rpm). Smooth, vibration-free meshing of worm gear 36 with a helical gear 31 is essential for this application, which is the drive mechanism 33 for a high density magnetic card read/recorder for a hand-held programmable calculator. Therefore, excessive vibration caused by looseness in or awkward mechanical action of coupler 10 cannot be tolerated. The design of coupler 10 eliminates the mechanical joints found in other couplers which are designed to allow for misalignment of the shafts they interconnect but which generally cause vibration at high speeds. The flexible, resilient material of coupler 10 also dampens vibration in the coupling and dampens vibration from other sources such as gears and bearings.

We claim:

1. A coupling assembly for coupling two smooth rotatable shafts comprising:
   a coupler having a substantially cylindrical shape with an outside diameter and an inside diameter that is accessible from either end thereof, said coupler being constructed of flexible and resilient material which elastically deforms to receive rotatable shafts at either end in uniform frictional engagement between the outside surface of the shafts and the inside surface of said inside diameter; and
   a hollow coupler sleeve having a substantially cylindrical shape with an inside diameter accessible from either end thereof, said coupler sleeve being constructed of substantially inflexible material for receiving the coupler within the inside diameter thereof to substantially limit the amount of elastic deformation of the outside diameter of the coupler and to increase the amount of diametrical force exerted on the rotatable shafts by the coupler;
   said uniform frictional engagement between the rotatable shafts and the coupler being increased by the increase in diametrical forces caused by the coupler sleeve.

2. A coupling assembly as in claim 1 wherein:
   the maximum inside diameter of the coupler is uniform and substantially less than the minimum outside diameter of the rotatable shafts; and
   the flexible material of which the coupler is constructed has physical characteristics similar to polyurethane.

3. A coupling assembly as in claim 1 for coupling first and second rotatable shafts, the first rotatable shaft having an outside diameter larger than the outside diameter of the second rotatable shaft wherein:
   a first portion of the inside diameter of the coupler extends from approximately the midpoint along the longitudinal axis to a first end thereof and is larger than a second portion of the inside diameter of the coupler which extends from approximately the midpoint along the longitudinal axis to a second end thereof for receiving the first and second rotatable shafts in frictional engagement with the first and second portions of the inside diameter of the coupler, respectively; and
   the outside diameter at the first end of the coupler is less than the outside diameter at the second end of the coupler for causing substantially uniform diametrical force to be exerted on the first and second rotatable shafts by the coupler when contained by the coupler sleeve.

4. A coupling assembly as in claim 3 wherein:
   the first portion of the inside diameter of the coupler is uniform and substantially less than the outside diameter of the first rotatable shaft; and
   the second portion of the inside diameter of the coupler is substantially smaller than the outside diameter of the second rotatable shaft.

5. A coupling assembly as in claim 3 wherein:
   a first end portion of the first rotatable shaft is substantially cylindrical shape having an inside diameter larger than the outside diameter of the second rotatable shaft for receiving the second rotatable shaft therein.

6. A coupling assembly as in claim 3 wherein the flexible material of which the coupler is constructed has physical characteristics similar to polyurethane.

* * * * *

UNITED STATES PATENT OFFICE
CERTIFICATE OF CORRECTION

Patent No. 3,863,464             Dated February 4, 1975

Inventor(s) Robert B. Taggart and Richard H. Barth

It is certified that error appears in the above-identified patent and that said Letters Patent are hereby corrected as shown below:

Column 1, line 35, "or" should read -- by --;

Column 3, line 6, after "expansion." insert -- Of course, if the diameter of the motor shaft were equal to the diameter of the worm gear shaft in the coupler region, the outside diameter of the coupler should be uniform to produce substantially uniform frictional force on both shafts. --.

Signed and sealed this 13th day of May 1975.

(SEAL)
Attest:

RUTH C. MASON
Attesting Officer

C. MARSHALL DANN
Commissioner of Patents
and Trademarks